United States Patent [19]

Brien et al.

[11] 4,454,224

[45] Jun. 12, 1984

[54] PHOTOGRAPHIC BLEACHING COMPOSITIONS

[75] Inventors: Gerald J. Brien; Jeffrey L. Hall, both of Rochester, N.Y.

[73] Assignee: Eastman Kodak Company, Rochester, N.Y.

[21] Appl. No.: 452,259

[22] Filed: Dec. 22, 1982

[51] Int. Cl.$^3$ .................. G03C 7/00; G03C 5/44; G03C 5/42

[52] U.S. Cl. .................. 430/393; 430/430; 430/461; 430/943

[58] Field of Search ............... 430/393, 373, 460, 461, 430/462, 943, 430

[56] References Cited

U.S. PATENT DOCUMENTS

| | | | |
|---|---|---|---|
| 4,045,225 | 8/1977 | Shimamura et al. | 430/373 |
| 4,045,226 | 8/1977 | Hara et al. | 430/373 |
| 4,069,050 | 1/1978 | Hara et al. | 430/373 |
| 4,146,397 | 3/1979 | Shimamura et al. | 430/373 |
| 4,277,556 | 7/1981 | Koboshi et al. | 430/393 |
| 4,301,236 | 11/1981 | Idota et al. | 430/393 |
| 4,328,306 | 5/1982 | Idota et al. | 430/393 |

FOREIGN PATENT DOCUMENTS 161335  12/1979  Japan .................. 430/373

Primary Examiner—Mary F. Downey
Attorney, Agent, or Firm—Alfred P. Lorenzo

[57] ABSTRACT

Fast acting and ecologically advantageous compositions for the bleaching of photographically developed silver are comprised of a peroxy compound, a buffering agent, and an aminopolyacetic or thiopolyacetic acid which contains at least three carboxyl groups.

18 Claims, No Drawings

PHOTOGRAPHIC BLEACHING COMPOSITIONS

FIELD OF THE INVENTION

This invention relates in general to photographic processing and in particular to methods and compositions for the bleaching of photographically developed silver. More specifically, this invention relates to a novel bleaching composition and to its use in the processing of photographic materials.

BACKGROUND OF THE INVENTION

In the production of color photographic images, it is usually necessary to remove the silver image which is formed coincident with the dye image. This can be done by oxidizing the silver by means of a suitable oxidizing agent, commonly referred to as a bleaching agent, in the presence of halide ion, followed by dissolving the silver halide so formed in a silver halide solvent, commonly referred to as a fixing agent. Alternatively, the bleaching agent and fixing agent can be combined in a bleach-fixing solution and the silver removed in one step by use of such solution.

In the reversal processing of black-and-white photographic materials, a bleaching step is also utilized to remove photographically developed silver.

A wide variety of bleaching agents are known for use in photographic processing, for example, ferricyanide bleaching agents, persulfate bleaching agents, dichromate bleaching agents, permanganate bleaching agents, ferric chloride, and water-soluble quinones. A particularly important class of bleaching agents are the aminopolycarboxylic acid bleaching agents, such as an ammonium or alkali metal salt of a ferric complex of ethylenediaminetetraacetic acid. These complexes are used in both bleach compositions and bleach-fix compositions.

It has also been proposed heretofore to use peroxy compounds, such as hydrogen peroxide, as bleaching agents in both bleach compositions and bleach-fix compositions. Thus, for example, Koboshi et al, U.S. Pat. No. 4,277,556, issued July 7, 1981, describes a photographic bleach-fixing composition which is an acidic aqueous solution containing hydrogen peroxide and certain organic acids or alkali metal salts thereof; Idota et al, U.S. Pat. No. 4,301,236 issued Nov. 17, 1981, describes a photographic bleaching composition which is an aqueous solution containing hydrogen peroxide, an organometallic complex salt, and an aromatic sulfonic acid or salt thereof; and Idota et al, U.S. Pat. No. 4,328,306 issued May 4, 1982, describes a method of bleaching with hydrogen peroxide and an organometallic complex salt utilizing a replenisher composed of a first composition containing the hydrogen peroxide and a second composition containing the organometallic complex salt.

Bleaching and bleach-fixing compositions known heretofore suffer from serious disadvantages which significantly limit their usefulness in photographic processing. For example, ferricyanide bleaching agents are very effective but create substantial difficulties in regard to safe disposal. Persulfate bleaching agents and aminopolycarboxylic acid bleaching agents are preferred from an ecological point of view because they present fewer problems in regard to disposal of waste processing solutions in which they are present. However, the persulfate bleaching agents and aminopolycarboxylic acid bleaching agents suffer from the disadvantage that they provide a bleaching action which is undesirably slow for use in many photographic processes and frequently require the use of a bleach accelerating agent. It is toward the objective of overcoming this problem by the provision of a novel bleaching composition which is fast and effective and which is highly advantageous from an ecological standpoint that the present invention is directed.

SUMMARY OF THE INVENTION

In accordance with this invention, a photographic bleaching composition comprises an aqueous solution having a pH of at least 7 and containing a peroxy compound, a buffering agent, and a polyacetic acid which contains at least three carboxyl groups and is selected from the group consisting of aminopolyacetic acids and thiopolyacetic acids. Such composition is especially advantageous in that it is prepared from inexpensive materials, is fast acting and effective, and forms no by-products which are ecologically harmful. It is useful in any photographic processing method in which it is desired to bleach photographically developed silver, including both black-and-white and color photographic processing methods.

DESCRIPTION OF THE PREFERRED EMBODIMENTS

The bleaching compositions of this invention are aqueous solutions of neutral or preferably, alkaline pH. They have a pH of at least 7, preferably in the range of from about 7.5 to about 11, and more preferably in the range of from about 8 to about 10. As indicated above, they are comprised of three essential ingredients, namely, a peroxy compound, a buffering agent, and a polyacetic acid which contains at least three carboxyl groups, such as, for example, a triacetic, tetraacetic or pentaacetic acid, and is either an aminopolyacetic acid, i.e., an acid characterized by the presence of $-CH_2COOH$ groups linked to amino nitrogen, or a thiopolyacetic acid, i.e., an acid characterized by the presence of $-CH_2COOH$ groups linked to sulfur.

The first essential ingredient of the novel bleaching compositions of this invention is a peroxy compound, that is, a compound characterized by the presence of the $-O-O-$ group in the molecule. Useful peroxy compounds include hydrogen peroxide, alkali metal perborates, and alkali metal percarbonates.

The second essential ingredient is a buffering agent, that is, an agent which serves to maintain the desired pH. Useful buffering agents include hydroxides such as sodium hydroxide, borates such as sodium metaborate, phosphates such as trisodium phosphate, carbonates such as sodium carbonate, and acetates such as sodium acetate.

The third essential ingredient is an aminopolyacetic or thiopolyacetic acid which contains at least three carboxyl groups. The function of the polyacetic acid is to complex the silver ion that is formed by the oxidizing action of the peroxy compound to thereby form a silver complex that is soluble in photographic fixing compositions and, accordingly, can be readily removed from a photographic element. Of the polyacetic acids of this class, the tetraacetic acids are preferred and 2-hydroxy-trimethylenedinitrilo tetraacetic acid is especially preferred. Examples of specific polyacetic acids which are useful in the bleaching compositions of this invention include:

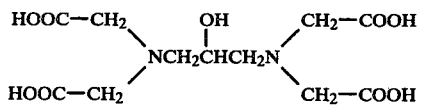

2-hydroxy-trimethylenedinitrilo tetraacetic acid,

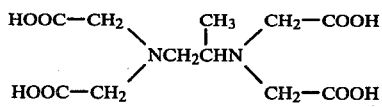

1,2-propanediaminetetraacetic acid,

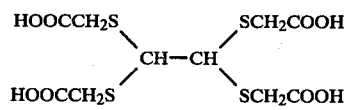

ethanediylidenetetrathio tetraacetic acid,

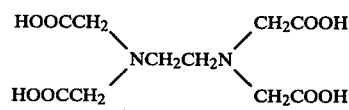

ethylenedinitrilo tetraacetic acid,

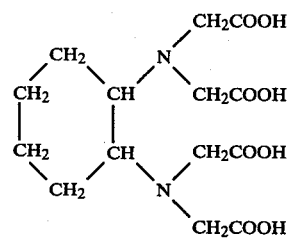

cyclohexylenedinitrilo tetraacetic acid,

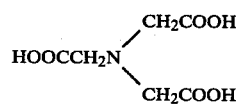

nitrilotriacetic acid,

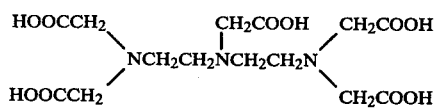

diethylenetriamine pentaacetic acid,
and the like.

While applicant does not wish to be bound by any theoretical explanation of the manner in which his invention functions, it is believed that the polyacetic acids described herein are effective in the bleaching composition because they function as non-passivating silver complexing agents, that is, as complexing agents which do not form a passivating layer on the silver which would interfere with the oxidizing action of the peroxy compound. By virtue of their complexing ability, they serve to drive the reaction between the peroxy compound and the silver in the desired direction.

In preparing the bleaching solutions of this invention, the three essential ingredients described above are dissolved in water in any suitable proportion. Preferably, the peroxy compound is utilized in an amount of from about 34 milligrams to about 34 grams per liter of bleach solution, and more preferably in an amount of from about 1 to about 4 grams per liter. The buffering agent is preferably utilized at a concentration ranging from about $10^{-4}$ molar to about $10^1$ molar and more preferably at a concentration ranging from about $10^{-2}$ molar to about $10^{-1}$ molar, while the polyacetic acid is preferably utilized at a concentration ranging from about $10^{-3}$ molar to about $10^1$ molar and more preferably at a concentration ranging from about $10^{-2}$ molar to about $10^{-1}$ molar.

The effectiveness of the bleaching compositions of this invention in regard to both bleaching rate and ability to effect removal of all of the silver image, i.e., ability to clean-out to completion, is dependent upon the particular compounds utilized to form the bleaching composition as well as their concentrations. As previously indicated, the pH is most preferably in the range of from about 8 to about 10. The reason for this preference, is that the bleaching rate is usually fastest within this range.

The bleaching compositions of this invention are especially useful in the color processing of photographic elements. Such processing is typically carried out using a color developing solution which contains a primary aromatic amino color developing agent. These color developing agents are well known and widely used in a variety of color photographic processes. They include aminophenols and p-phenylenediamines.

Examples of aminophenol developing agents include o-aminophenol, p-aminophenol, 5-amino-2-hydroxytoluene, 2-amino-3-hydroxytoluene, 2-hydroxy-3-amino-1,4-dimethylbenzene, and the like.

Particularly useful primary aromatic amino color developing agents are the p-phenylenediamines and especially the N-N-dialkyl-p-phenylenediamines in which the alkyl groups or the aromatic nucleus can be substituted or unsubstituted. Examples of useful p-phenylenediamine color developing agents include:
N-N-diethyl-p-phenylenediamine-monohydrochloride,
4-N,N-diethyl-2-methylphenylenediamine monohydrochloride,
4-(N-ethyl-N-2-methanesulfonylaminoethyl)-2-methylphenylenediamine sesquisulfate monohydrate,
4-(N-ethyl-N-2-hydroxyethyl)-2-methylphenylenediamine sulfate,
4-N,N-diethyl-2,2'-methanesulfonylaminoethylphenylenediamine hydrochloride,
and the like.

In addition to the primary aromatic amino color developing agent, color developer compositions typically contain a variety of other agents such as alkalies to control pH, bromides, iodides, benzyl alcohol, anti-oxidants, anti-foggants, solubilizing agents, brightening agents, and so forth.

In utilizing the novel bleaching solutions of this invention in photographic color processing, care should be taken to ensure that the color developing agent is not carried over into the bleaching solution, as this can result in indiscriminate dye formation in the photographic element. This is readily avoided by the use of a stop bath following the development step, for example, an acetic acid stop bath.

The bleaching compositions of this invention are capable of effectively oxidizing photographically developed silver without exerting any significant adverse effects on the dye image which is formed coincident with the silver image in the processing of photographic color materials.

The bleaching compositions of this invention do not also perform a fixing function and, accordingly, are not bleach-fixing compositions. They act on the photographically developed silver to form a soluble silver complex. This complex can be readily removed from the photographic element by the use of a conventional fixing bath. Such fixing baths typically contain a thiosulfate, such as ammonium thiosulfate or an alkali metal thiosulfate, as the fixing agent.

A preferred process in accordance with the present invention for use in the processing of photographic color materials comprises treatment of the material, in sequence, in the following processing baths:
(1) color developer bath
(2) stop bath
(3) wash
(4) bleach bath
(5) wash
(6) fixing bath
(7) wash In this process, the color developer bath, stop bath and fixing bath can be any of those conventionally used in photographic color processing while the bleach bath is, in accordance with the invention, an aqueous solution having a pH of at least 7 which contains a peroxy compound, a buffering agent and a polyacetic acid which contains at least three carboxyl groups and is selected from the group consisting of aminopolyacetic acids and thiopolyacetic acids. A stop bath and wash are used between the color developing and bleaching steps to ensure that the color developing agent is not carried over into the bleaching solution.

The novel methods and compositions of the present invention can be utilized with any of a wide variety of photographic elements. For a detailed description of useful photographic elements and methods for their manufacture, reference can be made to Research Disclosure, Item 17643, Vol. 176, December, 1978, published by Industrial Opportunities Ltd., Homewell, Havant Hampshire, PO9 1EF, United Kingdom.

The invention is further illustrated by the following examples of its practice.

EXAMPLE 1

A photographic element was prepared by coating a film support with a photographic emulsion comprising gelatin, silver bromide with an average grain size of 0.2 microns, a magenta-dye-forming coupler, and tricresyl phosphate. The coupler that was utilized is described in U.S. Pat. No. 2,600,788, and is represented by the formula:

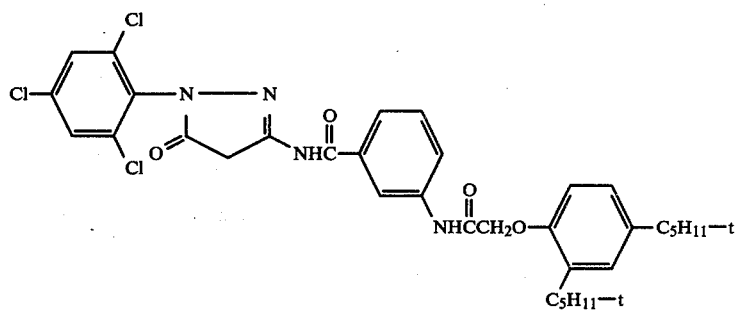

The photographic emulsion was coated in an amount providing 1.62 g/m² of silver, 0.37 g/m² of the coupler, 0.185 g/m² of tricresyl phosphate, and 2.15 g/m² of gelatin.

A sample of the above-described element was imagewise exposed for one second on a sensitometer through a neutral graduated-density test object having a density range from zero to three with each step having a density of 0.15 more than the previous step, black-and-white developed for two minutes, stopped, washed, and bleached in the following bleach bath:

| | |
|---|---|
| Potassium carbonate | 40 grams |
| 2-Hydroxy-trimethylenedinitrilo tetraacetic acid | 5 grams |
| Hydrogen peroxide (30% solution) | 5 milliliters |
| pH to 11.0 with KOH or H$_2$SO$_4$ | |
| Water to one liter. | |

Bleaching was carried out for a period of five minutes, and then the sample was washed, fixed, washed and stabilized.

In order to evaluate the processed sample, an infrared density measurement was made as an indication of the amount of residual silver present in the D$_{max}$ region of the sample. The result obtained was an infrared density of 0.01, indicating that essentially complete bleaching had occurred.

A second sample of the photographic element was processed in the identical manner except that the pH of the bleach bath was adjusted to 10.0. In this case, the infrared density obtained was 0.04, indicating that essentially complete bleaching had occurred.

A third sample of the photographic element was processed in the identical manner except that the bleach bath was a control solution which contained hydrogen peroxide but did not contain 2-hydroxy-trimethylenedinitrilo tetraacetic acid. The composition of this control solution was as follows:

| | |
|---|---|
| Potassium carbonate | 40 grams |
| Hydrogen peroxide (30% solution) | 5 milliliters |
| pH to 11.0 with KOH or H$_2$SO$_4$ | |
| Water to one liter. | |

The infrared density obtained was 2.15, indicating that essentially no bleaching had occurred.

A fourth sample of the photographic element was processed in the identical manner except that the bleach bath was a control solution which contained 2-hydroxytrimethylenedinitrilotetraacetic acid, but did not contain hydrogen peroxide. The composition of this control solution was as follows:

| | |
|---|---|
| Potassium carbonate | 40 grams |
| 2-Hydroxy-trimethylene-dinitrilo tetraacetic acid | 5 grams |
| pH to 11.0 with KOH or $H_2SO_4$ | |
| Water to one liter. | |

The infrared density obtained was 2.17, indicating that essentially no bleaching had occurred.

EXAMPLE 2

Example 1 was repeated using as the bleaching bath the following composition:

| | |
|---|---|
| Potassium carbonate | 40 grams |
| Hydrogen peroxide (30% solution) | 5 milliliters |
| Ethylenedinitrilo tetraacetic acid | 5 grams |
| pH to 11.0 with KOH or $H_2SO_4$ | |
| Water to one liter. | |

The infrared density obtained was 0.24, indicating that the composition was a useful bleach but somewhat less effective than the bleach solution of Example 1.

EXAMPLE 3

A photographic element was prepared by coating a film support with a silver chloride photographic emulsion, spectrally sensitized with anhydro-3-ethyl-9,11-neopentylene-3'-(3-sulfopropyl)thiadicarbocyanine hydroxide (33 mg/mole Ag) and coated at 1.03 g Ag/m$^2$ and 2.15 g gel/m$^2$.

Samples of the above-described element were flash exposed and developed with a color developer which had a pH of 10.05 and contained the following ingredients:

| Component | Concentration |
|---|---|
| Benzyl alcohol | 11.0 milliliters/liter |
| $K_2SO_3$ | 0.2 grams/liter |
| KCl | 2.1 grams/liter |
| $K_2CO_3$ | 31.0 grams/liter |
| Developing agent* | 4.2 grams/liter |
| $H_2SO_4$ | 1.75 grams/liter |

*4-amino-3-methyl-N—ethyl-N—beta-(methanesulfonamido-ethyl)aniline sulfate hydrate.

The exposed and developed samples were bleached in bleaching solutions of the composition described below and the rate of bleaching was determined spectroscopically. A monitoring wavelength of 1000 nm was utilized. The bleaching rate is reported below in terms of a half-time value, that is, the time in seconds that it took for the optical density of the silver to be reduced to one-half of the value measured at six seconds into the reaction. In each case, the bleaching solution was of the following composition:

| | |
|---|---|
| $4.4 \times 10^{-2}$ | M $H_2O_2$ |
| $1.55 \times 10^{-2}$ | M polyacetic acid |
| $1 \times 10^{-2}$ | M borax buffer |
| | pH = 9.0 |

The polyacetic acids utilized and the results obtained were as follows:

| Polyacetic Acid | Half-Time (seconds) |
|---|---|
| 2-Hydroxy-trimethylenedinitrilo-tetraacetic acid | 82 |
| 1,2-Propanediaminetetraacetic acid | 215 |
| Ethanediylidenetetrathio tetra-acetic acid | 216 |
| Ethylenedinitrilo tetraacetic acid | 225 |
| Cyclohexylenedinitrilo tetraacetic acid | 255 |
| Nitrilotriacetic acid | 492 |

The data reported above indicate that each of the polyacetic acids evaluated provided an effective bleaching solution, but that the bleaching rate varied substantially, depending on the particular polyacetic acid utilized.

EXAMPLE 4

Samples of the photographic element described in Example 3 were bleached in bleaching baths prepared with different buffering agents to evaluate the effects of variation in buffer and in pH. In each case, the formulation of the bleaching solution was as follows:

| | |
|---|---|
| $4.4 \times 10^{-2}$ | M $H_2O_2$ |
| $1.55 \times 10^{-2}$ | M polyacetic acid |
| $1 \times 10^{-2}$ | M buffer |

The compositions utilized and the results obtained are summarized in the following table:

| Polyacetic Acid | Buffer | pH | Half-Time (seconds) |
|---|---|---|---|
| None | Carbonate | 11.0 | No bleaching |
| 2-Hydroxy-trimethylenedinitrilo tetraacetic acid | Carbonate | 11.0 | 209 |
| " | Carbonate | 10.0 | 103 |
| " | Carbonate | 9.0 | 93 |
| " | Borax | 10.0 | 145 |
| " | Borax | 9.0 | 82 |
| " | Borax | 8.0 | 250 |
| " | Acetate | 7.0 | 253 |
| " | Acetate | 5.0 | No bleaching |
| Ethylenedinitrilo tetraacetic acid | Carbonate | 11.0 | 600 |
| " | Carbonate | 10.0 | 315 |
| " | Carbonate | 9.0 | 222 |
| " | Borax | 10.0 | 380 |
| " | Borax | 9.0 | 246 |
| " | Borax | 8.0 | 161 |
| " | Acetate | 7.0 | 180 |
| " | Acetate | 5.0 | >600 |
| Cyclohexylenedinitrilo tetraacetic acid | Carbonate | 11.0 | >600 |

-continued

| Polyacetic Acid | Buffer | pH | Half-Time (seconds) |
|---|---|---|---|
| " | Carbonate | 10.0 | 336 |
| " | Carbonate | 9.0 | 217 |
| " | Borax | 10.0 | 399 |
| " | Borax | 9.0 | 349 |
| " | Borax | 8.0 | 219 |
| " | Acetate | 7.0 | 251 |
| " | Acetate | 5.0 | 342 |
| 1,2-Propanediaminetetraacetic acid | Carbonate | 11.0 | 453 |
| " | Carbonate | 10.0 | 318 |
| " | Carbonate | 9.0 | 217 |
| " | Borax | 10.0 | 325 |
| " | Borax | 9.0 | 266 |
| " | Borax | 8.0 | 172 |
| " | Acetate | 7.0 | 191 |
| " | Acetate | 5.0 | 393 |
| Ethanediylidenetetrathio tetraacetic acid | Borax | 10.0 | 430 |
| " | Borax | 9.0 | 249 |
| " | Borax | 8.0 | 159 |
| " | Acetate | 7.0 | >600 |
| " | Acetate | 5.0 | >600 |
| Nitrilotriacetic acid | Carbonate | 11.0 | No bleaching |
| " | Borax | 9.0 | 492 |

As indicated by the results reported above, the bleaching rate is strongly affected by the pH and to a lesser extent, by the particular buffering agent utilized. It is also strongly affected by the silver complexing agent. The most rapid bleaching (a half-time value of 82 seconds) was achieved with a borax buffered bleaching solution having a pH of 9.0 in which the silver complexing agent was 2-hydroxy-trimethylenedinitrilo tetraacetic acid.

EXAMPLE 5

A sample of the photographic element described in Example 3 was D-max exposed and developed in the manner described in Example 3. It was then bleached for 10 minutes in a bleaching solution of the following composition:

| | |
|---|---|
| $H_2O_2$ (30% solution) | 50.0 ml/liter |
| 2-Hydroxy-trimethylenedinitrilo tetraacetic acid | 5.0 g/liter |
| pH 9.0 with KOH | |

A portion of the sample was washed and dried after bleaching, while the remaining portion was washed, fixed with an ammonium thiosulfate fixing solution, washed and dried.

Prior to processing, the photographic element contained 98.0 cg/m$^2$ of silver. Of this amount of silver, 69.6 cg/m$^2$ were developed in the D-max area. Residual silver was analyzed by X-ray fluorescence. For the portion that had been subjected only to bleaching, the residual silver was 95.6 cg/m$^2$. For the portion that had been subjected to both bleaching and fixing, the residual silver was zero.

For purposes of comparison, a second sample was bleached for 10 minutes in a solution of the type described in U.S. Pat. No. 4,277,556. The composition of the solution was as follows:

| | |
|---|---|
| $H_2O_2$ (30% solution) | 50 ml/liter |
| Concentrated acetic acid | 30 ml/liter |
| pH 4.1 with NaOH | |

Residual silver as determined by X-ray fluorescence for this sample was 31.9 cg/m$^2$. When the sample was treated with an ammonium thiosulfate fix following the treatment with the solution described above, the residual silver was 6.4 cg/m$^2$. These results indicate that the solution of U.S. Pat. No. 4,277,556 performed both a bleaching and a fixing function, but did not clean-out to completion. On the other hand, the solution prepared in accordance with the present invention is a more effective bleach bath but does not perform a fixing function. In contrast with the acidic bleach-fixing compositions of U.S. Pat. No. 4,277,556, the neutral or alkaline bleaching compositions of the present invention provide unexpected beneficial results, including enhanced bleaching rate and greater ability to effect removal of all of the silver image, i.e., ability to clean-out to completion.

EXAMPLE 6

Samples of the photographic element described in Example 3 were bleached in bleaching baths prepared in accordance with the following formulation:

| | |
|---|---|
| $4.4 \times 10^{-2}$ | M $H_2O_2$ |
| $1.55 \times 10^{-2}$ | M polyacetic acid |
| $1 \times 10^{-2}$ | M buffer |

The bleaching compositions utilized and the results obtained are summarized in the following table:

| Polyacetic Acid | Buffer | pH | Half-Time (seconds) |
|---|---|---|---|
| Methyliminodiacetic acid | Borax | 10.0 | No bleaching |
| " | Borax | 9.0 | No bleaching |
| " | Borax | 8.0 | No bleaching |
| " | Sodium acetate | 6.0 | No bleaching |
| Diethylenetriamine pentaacetic acid | Borax | 10.0 | 429 |
| " | Borax | 9.0 | 279 |
| " | Borax | 8.0 | 168 |
| " | Borax | 8.0 | 135[1] |
| " | Borax | 8.0 | 90[2] |
| " | Sodium acetate | 7.0 | 156 |
| " | Sodium | 6.0 | 147 |

| Polyacetic Acid | Buffer | pH | Half-Time (seconds) |
|---|---|---|---|
| | acetate | | |

[1] In this test the concentration of $H_2O_2$ was 0.11 M
[2] In this test the concentration of $H_2O_2$ was 0.44 M Consideration of the results reported in the table above, indicates that methyliminodiacetic acid which has the formula:

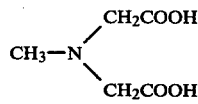

does not promote alkaline hydrogen peroxide oxidation of developed silver. This acid, which contains only two carboxyl groups, is outside the scope of the present invention which requires a polyacetic acid containing at least three carboxyl groups. The results also show that the concentration of hydrogen peroxide strongly influences the bleaching rate. For example, with borax buffered solutions at a pH of 8.0 containing diethylenetriamine pentaacetic acid, the half-time was 168 seconds at a hydrogen peroxide concentration of 0.044 M but only 90 seconds at a hydrogen peroxide concentration of 0.44 M.

EXAMPLE 7

A single layer cyan-dye-forming photographic element was prepared comprising silver chloride (0.54 g/m²), gelatin (2.58 g/m²), the cyan-dye-forming coupler 1-hydroxy-2-[Δ-(2,4-di-tert-amylphenoxy)-n-butyl]-naphthamide (0.38 g/m²), and the gelatin hardener bis(vinylsulfonylmethyl) ether (2% by weight of gelatin). The element was exposed for 0.2 seconds (500 W, 3000° K.) through a graduated density step wedge and processed at 31.1° C. according to the following sequence:

| Solution | Time (minutes) | |
|---|---|---|
| | Process A | Process B |
| Developer | 3.5 | 3.5 |
| Stop bath | 1 | — |
| Wash | 1 | — |
| Bleach | 5 | 5 |
| Wash | 3 | 3 |
| Fix | 4 | 4 |
| Wash | 3 | 3 |

In both process A and process B, the developing solution was that described in Example 3 above and the composition of the bleach solution was as follows:

| | |
|---|---|
| $K_2CO_3$ | 40 grams |
| $H_2O_2$ (30% solution) | 5.0 milliliters |
| 2-hydroxy-trimethylenedinitrilo tetraacetic acid | 5.0 grams |
| Water to one liter, pH = 11.0 | |

The only difference between processes A and B was that no stop bath or wash was employed between the developer and the bleach in process B.

After processing, the cyan dye density of the photographic coating was read through three Wratten 52 filters, and the retained silver was measured. The dye densities obtained and the amounts of retained silver (2nd step, D-max), were as follows:

| | Process A | Process B |
|---|---|---|
| Dye density Step 19 (Min) | 0.14 | 0.54 |
| Step 7 (Max) | 1.04 | 1.03 |
| Retained silver (g/m²) | 0.02 | 0.03 |

The results reported above indicate that the bleach was highly effective in removing the developed silver. They also indicate that a stop and wash sequence is advantageously employed between the developing step and the bleaching step to avoid the problems resulting from carryover of developer into the bleach.

As shown by the above examples, the bleaching compositions of this invention are highly effective in regard to bleaching activity, and thereby useful alternatives to bleaching compositions conventionally used in the photographic art, such as the ferricyanide bleaching compositions, the persulfate bleaching compositions, and the bleaching compositions comprising a ferric complex of an aminopolycarboxylic acid. Among the advantages possessed by the bleaching compositions of this invention are the fact that they are prepared from low cost ingredients that are readily available, and the fact that no ecologically disadvantageous by-products result from their use.

The invention has been described in detail with particular reference to preferred embodiments thereof, but it will be understood that variations and modifications can be effected within the spirit and scope of the invention.

We claim:

1. A photographic bleaching composition consisting essentially of an aqueous solution having a pH of at least 7 which contains a peroxy compound, a buffering agent, and a polyacetic acid which contains at least three carboxyl groups and is selected from the group consisting of aminopolyacetic acids and thiopolyacetic acids.

2. A photographic bleaching composition as claimed in claim 1 wherein said pH is in the range of from about 8 to about 10.

3. A photographic bleaching composition as claimed in claim 1 wherein said peroxy compound is hydrogen peroxide.

4. A photographic bleaching composition as claimed in claim 1 wherein said buffering agent is selected from the group consisting of hydroxides, borates, phosphates, carbonates, and acetates.

5. A photographic bleaching composition as claimed in claim 1 wherein said polyacetic acid is selected from the group consisting of:
2-hydroxy-trimethylenedinitrilo tetraacetic acid,
1,2-propanediaminetetraacetic acid,
ethanediylidenetetrathio tetraacetic acid,
ethylenedinitrilo tetraacetic acid,
cyclohexylenedinitrilo tetraacetic acid,
nitrilotriacetic acid, and
diethylenetriamine pentaacetic acid.

6. A photographic bleaching composition as claimed in claim 1 wherein said polyacetic acid is 2-hydroxy-trimethylenedinitrilo tetraacetic acid.

7. A photographic bleaching composition consisting essentially of an aqueous solution having a pH in the range of from about 8 to about 10 which contains hydrogen peroxide, potassium carbonate, and 2-hydroxy-trimethylenedinitrilo tetraacetic acid.

8. A method of treating a photographic element in order to bleach a photographically developed silver image which is present therein, said method comprising contacting said element with a bleaching composition consisting essentially of an aqueous solution having a pH of at least 7 which contains a peroxy compound, a buffering agent, and a polyacetic acid which contains at least three carboxyl groups and is selected from the group consisting of aminopolyacetic acids and thiopolyacetic acids.

9. A method as claimed in claim 8 wherein said pH is in the range of from about 8 to about 10.

10. A method as claimed in claim 8 wherein said peroxy compound is hydrogen peroxide.

11. A method as claimed in claim 8 wherein said buffering agent is selected from the group consisting of hydroxides, borates, phosphates, carbonates, and acetates.

12. A method as claimed in claim 8 wherein said polyacetic acid is selected from the group consisting of:
2-hydroxy-trimethylenedinitrilo tetraacetic acid,
1,2-propanediaminetetraacetic acid,
ethanediylidenetetrathio tetraacetic acid,
ethylenedinitrilo tetraacetic acid,
cyclohexylenedinitrilo tetraacetic acid,
nitrilotriacetic acid, and
diethylenetriamine pentaacetic acid.

13. A method as claimed in claim 8 wherein said polyacetic acid is 2-hydroxy-trimethylenedinitrilo tetraacetic acid.

14. A method of treating a photographic element in order to bleach a photographically developed silver image which is present therein, said method comprising contacting said element with a bleaching composition consisting essentially of an aqueous solution having a pH in the range of from about 8 to about 10 which contains hydrogen peroxide, potassium carbonate, and 2-hydroxy-trimethylenedinitrilo tetraacetic acid.

15. A method of treating a photographic element in order to remove only the silver image from an emulsion layer thereof which contains both a silver image and a dye image, which method comprises contacting said layer with a bleaching composition to form a silver complex and thereafter contacting said layer with a fixing composition to remove said complex from said layer, said bleaching composition consisting essentially of an aqueous solution having a pH of at least 7 which contains a peroxy compound, a buffering agent, and a polyacetic acid which contains at least three carboxyl groups and is selected from the group consisting of aminopolyacetic acids and thiopolyacetic acids.

16. In a method of photographic color processing comprising the steps of color developing, stopping, bleaching and fixing, the improvement wherein said bleaching step is carried out with a composition consisting essentially of an aqueous solution having a pH of at least 7 which contains a peroxy compound, a buffering agent, and a polyacetic acid which contains at least three carboxyl groups and is selected from the group consisting of aminopolyacetic acids and thiopolyacetic acids.

17. A method as claimed in claim 16 wherein said peroxy compound is hydrogen peroxide.

18. A method as claimed in claim 17 wherein said pH is in the range of from about 8 to about 10 and said polyacetic acid is 2-hydroxy-trimethylenedinitrilo tetraacetic acid.

* * * * *